United States Patent [19]
Fletcher

[11] Patent Number: 5,747,088
[45] Date of Patent: May 5, 1998

[54] METHOD OF PRODUCING FRUIT JUICES AND AN EDIBLE INFUSED SOLID FRUIT PRODUCT

[76] Inventor: LeRoy W. Fletcher, 100 - 2nd Ave., Zillah, Wash. 98953

[21] Appl. No.: 675,538

[22] Filed: Jul. 3, 1996

[51] Int. Cl.$^6$ .................................................. A23L 2/04
[52] U.S. Cl. .................... 426/425; 426/478; 426/489; 426/495; 426/518; 426/520; 426/615
[58] Field of Search ............................ 426/639, 640, 426/655, 425, 478, 489, 495, 518, 520, 599, 615

[56] References Cited

U.S. PATENT DOCUMENTS

| | | | |
|---|---|---|---|
| 2,692,831 | 10/1954 | Weckel et al. | 99/103 |
| 2,785,071 | 3/1957 | Mathews | 99/102 |
| 2,865,758 | 12/1958 | Weckel | 99/102 |
| 4,390,550 | 6/1983 | Kahn et al. | 426/102 |
| 4,551,348 | 11/1985 | O'Mahony et al. | 426/639 |
| 4,775,545 | 10/1988 | Augustine et al. | 426/639 |
| 4,814,190 | 3/1989 | Ismail | 426/102 |
| 5,156,872 | 10/1992 | Lee | 426/489 |
| 5,231,922 | 8/1993 | Hartmann | 426/489 X |
| 5,320,861 | 6/1994 | Mantius et al. | 426/599 |
| 5,388,507 | 2/1995 | Bonnet | 426/489 X |
| 5,419,251 | 5/1995 | Mantius et al. | 99/510 |
| 5,613,434 | 3/1997 | Hartmann | 426/489 X |

*Primary Examiner*—Milton Cano
*Attorney, Agent, or Firm*—Christensen O'Connor Johnson & Kindness PLLC

[57] ABSTRACT

A method of treating fruit to produce a liquid fruit juice and an edible fruit solid. The method includes cutting the fruit to expose an inner portion, and extracting the cut fruit with water, in the temperature range 100° to 130° F., under conditions of rapid cyclical pressure variation. The pressure variation significantly enhances the rate and extent of extraction of fruit components, such as acids and sugars, from the fruit. The extracted juice is separated from the residual fruit, and may be concentrated or sold as a standard fruit juice. The residual fruit are infused with a solution including sugar, food acids, and optionally other food additives, flavorings and a colorant, and then dried to produce an edible fruit product.

23 Claims, 4 Drawing Sheets

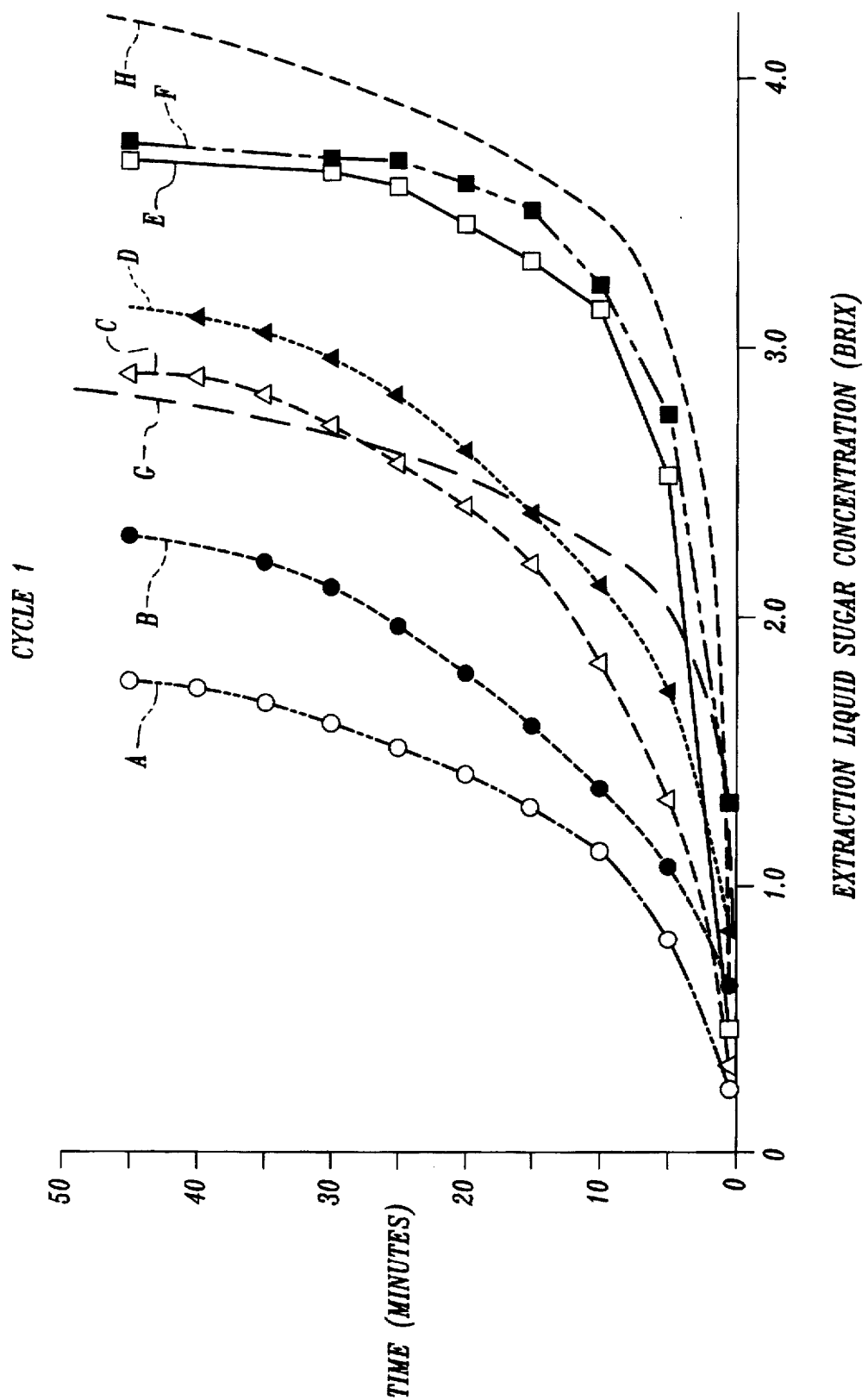

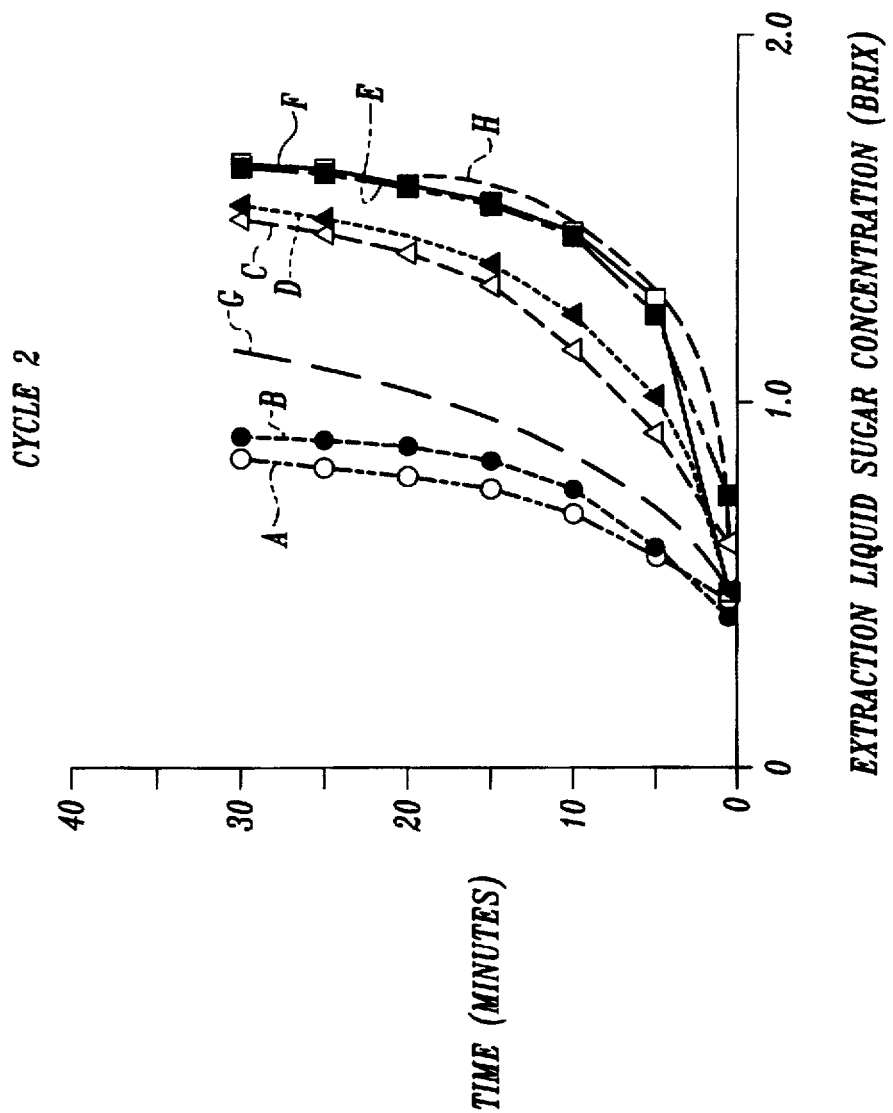

5,747,088

METHOD OF PRODUCING FRUIT JUICES AND AN EDIBLE INFUSED SOLID FRUIT PRODUCT

FIELD OF THE INVENTION

The invention relates to methods for processing fruits, including berries such as cranberries, to produce a fruit juice, in concentrate or other form, and an edible infused solid fruit product.

BACKGROUND OF THE INVENTION

The extraction of fruit juice from a variety of fruits, including berries, is long known in the art. The extracted fruit juices are frequently converted into a concentrate, more suitable for transportation, and then reconstituted into a consumable form by addition of water at the destination, or by the consumer. The extracted fruit residue have frequently provided a disposal problem. For example, cranberry residue from which fruit juices have been removed have posed a problem. A process to reinfuse the extracted cranberry solids with sugar, and flavorings, to produce an edible product is set forth in U.S. Pat. No. 5,320,861. However, for most cranberry fruit processors the extracted cranberry solids are a waste product that presents a costly disposal problem.

The extraction of juice from fruit, such as cranberries, is time consuming and expensive, requiring modem, expensive capital equipment such as juice extractors. For example, U.S. Pat. No. 5,320,861 indicates that the residence time of cranberries in an extractor is "greater than about 90 minutes, such as about 120–150 minutes." Clearly, the longer the residence time required in an extractor, the lower the throughput of the extractor. In order to maximize use of the extractor, by improving throughput rate, it is desirable to reduce this lengthy residence time. At the same time, juice yield must be maintained and yield generally decreases with decreasing residence time. If residence time reduction can be achieved while yield is maintained, then purchase of additional expensive extractors can be avoided, or delayed when there is a steadily increasing demand for extracted cranberry products. Moreover, if waste cranberry residue that is now wasted can instead be processed into an edible product for human consumption, then significant cost savings and increased revenues could be achieved.

SUMMARY OF THE INVENTION

The invention provides a method of processing fruit, into an extracted, sugar and acid-infused, solid product and a liquid product. The method reduces extractor residence time significantly while maintaining, or improving, the percentage of fruit components extracted from the fruit. The invention also provides a method of treating extracted fruit residues to make an edible product. The method can be readily applied to a variety of conventional extractors, with modifications, as explained below. The products of the method of the invention are a fruit juice, or fruit juice concentrate, and an edible acid- and sugar-infused, solid fruit product.

In accordance with the method, the inner portion of the fruit, beneath an overlying skin, is exposed. This exposure is preferably carried out by cutting the fruit substantially in half. Optionally, the skin of the halved fruit is also cut or nicked to further expose the inner portion. The exposed fruit is then subjected to an extraction process, in a liquid medium such as water, that is maintained at a temperature sufficiently high to enhance the extraction of soluble fruit components from the fruit, without denaturing the fruit, the extracted fruit components, or the fruit residue. Importantly, during the extraction, the fruit is subjected to rapid pressure variations, generally varying from a vacuum of about 24 inches Hg, to atmospheric, or above. This pressure cycling or pulsing, having a preferred cycle time (or "period") of about 20 seconds to about 5 minutes, but most preferably about two minutes to about 45 seconds, is effective in increasing the rate of soluble fruit component extraction from the fruit so that the residence time of the fruit in the extractor can be significantly reduced, preferably by at least about fifty percent. Also, due to the high degree of extraction obtained, the extracted fruit residue has a low fruit acid content. Thus, as explained below, fruit acids must be added to the extracted fruit if it is desired to make a suitable fruity-tasting product.

After extraction, the extracted fruit residue is separated from the extractor liquor that includes the extracted fruit components. The liquor may then be concentrated, by evaporation, reverse osmosis, or other methods, to produce a fruit juice concentrate, or blended to make a fruit juice ready for consumption.

The separated extracted fruit residue is processed in a second phase of the method of the invention. In this phase, the extracted fruit is infused with a solution that includes a fruit acid, sugar, and optionally food coloring, and other food additives, such as vitamins and flavoring. The infused fruit is then separated from the infusing solution, washed to remove any surface-adherent sugar, and dried to a moisture content of about 14 to about 22 wt %. After drying, the infused fruit may be lightly coated with an edible oil, by spraying with a mist of oil, to facilitate handling and packaging.

As a result of practicing the method of the invention, the time of the extraction step of removing soluble fruit components from fruit is significantly reduced, thereby allowing a higher throughput through extractors that are pulsed with rapid pressure variations during the extraction process. Moreover, extracted fruit residue, otherwise discarded as a waste product, can be infused with food additives and sold as an edible product for human consumption.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a graphical representation of the variation of extraction liquid concentration (in brix) versus time of a first batch extraction in minutes; and FIG. 4 is a graphical representation of the variation of extraction liquid concentration (in brix) versus time of a second batch extraction in minutes.

DETAILED DESCRIPTION OF THE PREFERRED EMBODIMENT

The invention provides a method of processing fruit into a liquid product, and an edible, sugar-infused, solid fruit product. In order to achieve this, the method of the invention can be regarded as a two step process: a first step in which extractable fruit components are removed from the fruit; and a second step in which extracted fruit residues are treated to produce an edible solid fruit product.

Importantly, the extraction phase of the method of the invention is more efficient, requiring a significantly reduced residence time in an extractor, as compared to the prior art for an equivalent percentage of fruit solids extraction. Moreover, the method allows extraction of up to about 98% of the extractable fruit components from the fruit, depending on extraction time. Thus, the extraction of the invention combines a significant reduction in residence time with high yield of soluble fruit components. In the specification and claims, a "significant reduction in residence time" is a reduction of at least about 25%, preferably 50 to 70% or better. The second step of the method, producing an edible solid fruit product, includes a highly efficient countercurrent infusion step in which fruit acids, sugar, and other food additives, are commingled with extracted fruit residue from the first step under conditions that produce the edible product.

The term "pulsed," in relation to pressure variation, means an abrupt, preferably periodic, change in pressure from a baseline pressure, then a return to the baseline pressure. A cyclical pressure variation, while encompassing cyclical pulses, also includes more gradual pressure changes around a median pressure, for instance a pressure change that is a sinusoidal-type wave function with time. Most types of cyclical pressure variations are effective in the method of the invention depending upon period and magnitude of variation. The term "fruit components" refers to components extracted from fruit includes both water soluble and insoluble components (such as cell wall tissue) that is removed from natural fruit during extraction of juices. The terms "fruit solids" and "soluble fruit solids" refer to the sugars and water-soluble material occurring naturally in fruits. The term "fruit residue" refers to what remains of the fruit after extraction to remove fruit components.

Figure 1:
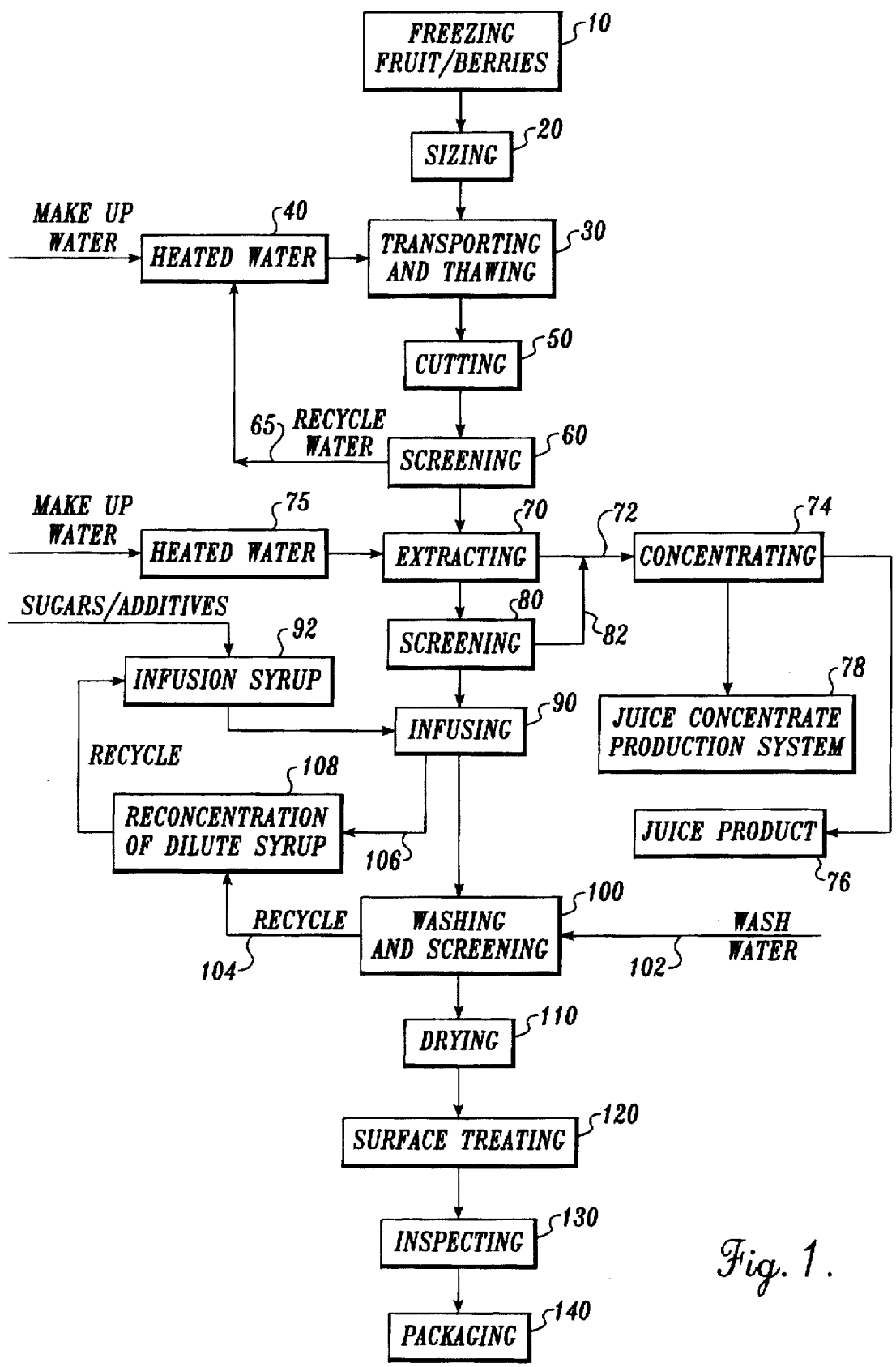
FIG. 1 is a process flowchart showing the steps of an embodiment of a method of the invention.

The method of the invention may be more readily appreciated with reference to FIG. 1, and the following explanation of the preferred embodiment illustrated in FIG. 1. Clearly, modifications and variations of this preferred method may become apparent to one of skill in the art, upon reading this disclosure. These variations and modifications are within the scope of the invention, as described and claimed herein. For ease of explanation, the fruit being processed will be described as cranberries, although other fruit are clearly also treatable through the method of the invention. Thus, in a first step 10, harvested cranberries are frozen for storage. Frozen berries are then removed from storage to undergo processing into cranberry juice and an edible solid cranberry fruit product. To facilitate extraction of edible fruit components, the cranberries are sized 20 through a series of screens, and the sized berries are transported through a flume 30 with heated water 40 to at least partially thaw the berries This partial thawing facilitates the step of cutting 50 the berries substantially into halves. Optionally, the extraction process could be further improved by cutting or nicking through the skin of the fruit halves to facilitate air removal as explained below. The cutting of the berries into halves, or exposing of the underlying fruit beneath the skin, is an important step in the method of the invention. Cranberries are "spongy" in nature and, as will be explained below, exposing the inner portion of the fruit to an extraction medium facilitates removal of soluble fruit components from the berries. Moreover, the freezing of the berries for storage also facilitates the extraction process because internal cellular structures of the berries are ruptured during the freezing process. Upon thawing, soluble and other fruit components are more readily extracted from the ruptured berry cell structure. Note that while the cell structures are ruptured, the berry retains its shape-integrity and its internal fibrous structures.

After cutting 50, the cut berries are screened 60 to remove the solid berry halves from the heated water. The water is then recycled 65 for reuse in thawing other berries for cutting.

For extracting juices, the halved berry portions are then fed to an extractor 70, preferably a countercurrent continuous extractor. Countercurrent operation is preferred because a maximum concentration gradient for extraction of fruit components from the fruit is maintained in this mode of extraction and continuous operation maximizes throughput. Thus, incoming extraction liquid, with the lowest concentration of fruit components (preferably water with a zero sugar or fruit component content), comes into contact with fruit solids from which most fruit components have been removed, at the fruit solids exit end of the extractor. Likewise, extraction liquid with the highest concentration of extracted fruit components is brought into contact with incoming fruit at the inlet of the extractor, that still contains the majority of its extractable fruit components. While extractors for countercurrent fruit extraction are known in the art, importantly, however, these extractors do not include a system for drawing a vacuum on the extractor—a significant feature for the method of the invention.

Figure 2:
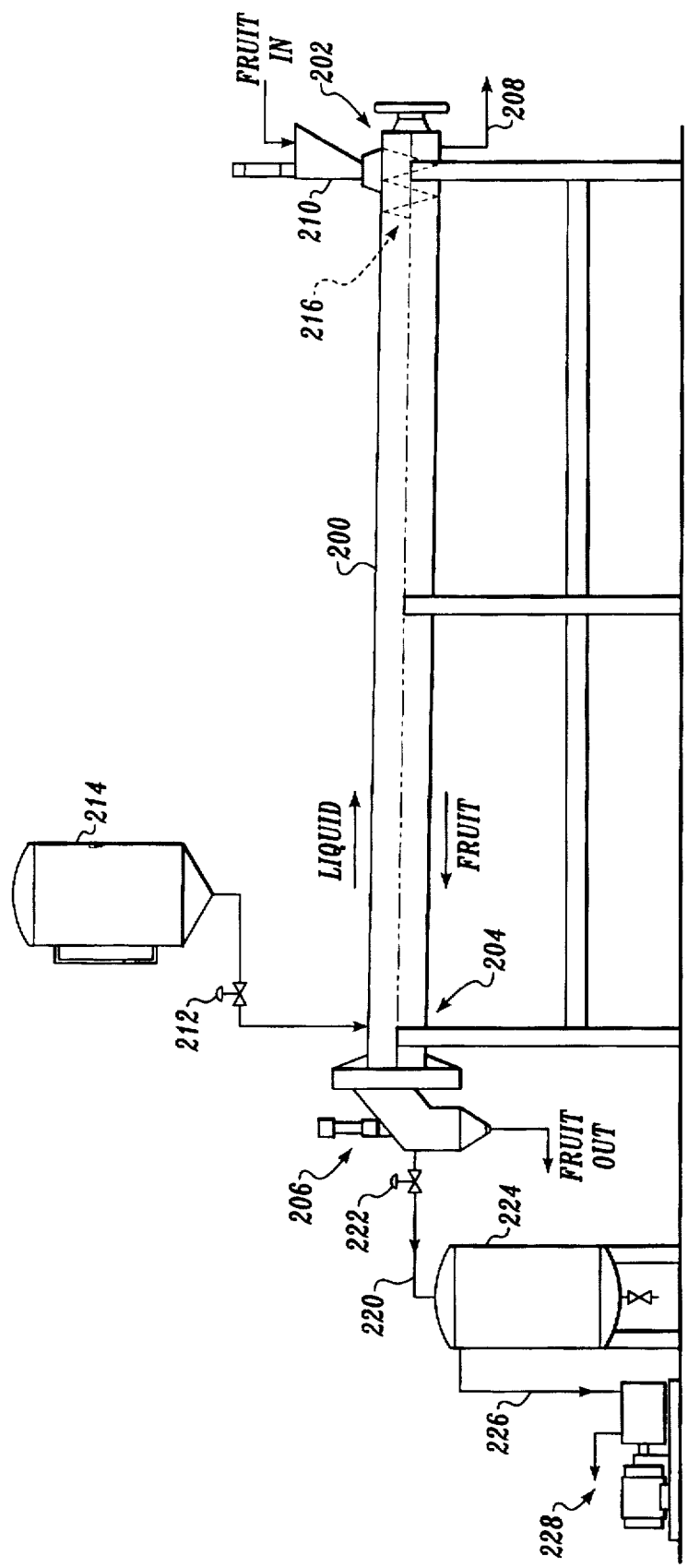
FIG. 2 is an exemplary schematic diagram of a countercurrent fruit extractor with a vacuum system, for use in accordance with the method of the invention.

FIG. 2 is a schematic diagram of an exemplary countercurrent fruit juice extractor, including a system for drawing a vacuum on the extractor, in accordance with the invention. The extractor has a hollow cylindrical body 200, inclined at a slight angle (about 5°) to the horizontal so that liquid flows from one end to the other under gravity. Fruit that has been cut, or otherwise treated to expose a portion beneath the surface, is fed into a feed hopper 210, mounted at the fruit inlet end 202 (the lower end) of the extractor and is controlledly fed into the extractor 200. At the other end of the extractor 200, the fruit exit end 204 (the higher elevation end), an extraction liquid, preferably heated water, is fed to the extractor 200 through an inlet duct 205, that includes a control valve 212 for controlling the rate of water flow, from a water storage container 214. A helical screw 216, or other transportation devices such as paddles, or plates, is used to transport cranberries from the fruit feed end 202 of the extractor towards the fruit exit end 204. At the same time, extraction liquid travels countercurrent to the fruit, from the slightly elevated fruit exit end 204 to the fruit inlet end 202. Treated fruit (extracted fruit residue) exits through an outlet header 206 and is then screened and separated from extraction liquid. The extraction liquid, with extracted fruit components, exits through conduit 208 at the fruit inlet end 202 of the extractor.

Under normal operation, the internal volume of extractor 200 is not completely filled. Rather, the extractor is about 50% to about 70% filled with water and fruit, with the remaining ullage space filled with air. In accordance with the invention, a conduit 220 extends from the fruit outlet header 206, so that it is in fluid communication with the ullage space of the extractor 200. Conduit 220 includes a control valve 222 that may be set to a timer, or otherwise controlled, for applying a pulsed or cyclical vacuum to the extractor 200. The vacuum system may be relatively simple, including a surge tank 224 in fluid communication with the other end of the vacuum duct 220, to entrap any liquid that may be carried over from the extractor. A duct 226 extends from an upper end of the surge tank 224 to the inlet of a compressor 228 that applies suction. Thus, as the compressor operates, a vacuum is pulled on the surge tank 224, and the duct 220. By opening and closing valve 222 periodically, a pulsed or cyclical vacuum is drawn on the extractor 200.

Clearly, other apparatus may be used for applying a vacuum on the variety of extractors commercially available. The present invention is not limited by the nature of the apparatus used, but is directed to the method of treating fruit, using a rapid cyclical or pulsed vacuum, to enhance the extraction of fruit components, especially soluble fruit components, from fruits.

Returning to the method illustrated in FIG. 1, preferably, the extracting 70 of the berries is carried out at a temperature that enhances the extraction of soluble fruit components from the fruit, but that does not denature the fruit, i.e., does not cause the fruit to begin to gel. Clearly, the longer the fruit is kept at the temperature, the greater the degree of denaturization. Thus, the temperature is also a function of residence time in the extractor. The shorter the residence time, the higher the allowable temperature. Moreover, higher temperatures improve extraction and hence allow reduction in residence time. In accordance with the invention, the preferred temperature is in the range from about 100° F. (38° C.) to about 130° F. (54° C.), more preferably from about 100° to about 115° F., and most preferably about 105° to about 110° F. The extracting liquid 75 is preferably water, and most preferably water without added sugar, or very little sugar if a recycled water stream is used, to maintain a high concentration gradient for extraction, as explained above. If recycled water from the juice concentration system (discussed below) is used, then preferably the sugar content is only a trace.

Importantly, the extraction is carried out under conditions of rapid pulsed or cyclically varying pressure that causes "pumping" of the berries. This pressure variation significantly enhances the rate of extraction of fruit components from the berries thereby significantly reducing the residence time in the extractor to achieve a specified level of residual fruit component (i.e. residual sugar) in the extracted fruit solids. As explained above, the berries are "spongy" with a density about 50% of water and are filled with internal voids that are exposed when the berry is cut. When the berries are immersed in water, air bubbles in these voids, are so small that they remain entrapped within the berry structure acting as a barrier to prevent water reaching and wetting the meat of the berry to extract sugars and other soluble components. When a vacuum is applied on the extractor, entrapped air escapes out of the expanded berries allowing water to enter the voids in the berries to extract fruit components. Thus, the rapid periodic pressure variation enhances extraction by removing air and pumping liquid in and out of the berries.

Preferably, the pressure in the extracting step is rapidly cycled or pulsed, at a rate that reduces the residence time of berries in the extractor significantly. A significant reduction in residence time is a reduction of at least about 25%, preferably at least about 50%, and most preferably at least about 70%, of the time required for the same degree of extraction when pressure cycling or pulsing is not applied. Preferably, a period of the pressure variation, ranging from vacuum (or low pressure), to atmospheric (or high pressure) and back to vacuum (low pressure), is less than about five minutes, more preferably about two minutes, and most preferably about two minutes to about 45 seconds. However, longer periods, and shorter periods, are also useful to achieve the significant reduction in residence time, discussed above. Clearly, pressure pulsing or cycling need not be uniform, and all that is needed is a sufficient magnitude of variation of the pressure from or about a base pressure to cause the "pumping" of liquid in and out of the berries a useful number of times during extraction to achieve the significant residence time reduction. While the pressure may range from a high pressure to a low pressure to cause removal of air from and "pumping" of liquid in the fruit structure, preferably the pressure ranges from about 30 psig to 27 inches Hg vacuum, more preferably about 15 psig to 24 inches Hg vacuum.

The method of the invention also allows a food processor the option of removing a higher proportion of fruit components from the berries. Thus, instead of removing about 90-95% of the soluble fruit solids, more than about 98% of the soluble fruit solids can be removed. However, clearly, the removal of additional soluble fruit solids requires a slightly longer residence time, although even this residence time is less than that required in prior art processes that do not utilize the pressure cycling or pulsing conditions of the method of the invention.

In an important aspect of the extraction, the residual fruit has a very low residual fruit acid content. Thus, even when infused with sugar, the infused product lacks a "fruit taste" unless food acids are also added back to the fruit residue by infusion.

It is believed that the method of the invention also provides a more concentrated fruit extract from the extractor so that less water must be removed to produce a gallon of concentrate of equivalent brix content. It is expected that the invention provides a juice from the extractor of about 6 brix or greater, so that 75.2 pounds of water have to be removed to produce one gallon of 50 brix concentrate. In the prior art, it is estimated that the juice at the extractor exit is about 2.5 brix, and about 195 pounds of water have to be removed to produce one gallon of 50 brix concentrate. Thus, about 60% less water has to be removed.

Returning to FIG. 1, a liquid product 72 is removed from the extractor, a dilute fruit juice, that may then be concentrated 74 to produce a fruit juice suitable for packaging and direct consumption 76, or processed into a concentrate 78.

The extracted fruit residue exiting from the extractor are screened 80 and any entrained liquid 82 is either recycled or, as illustrated, mixed with the liquid extract 72 from the extractor for the production of juice or concentrate. The screened residual fruit are then transported to a countercurrent infuser 90.

In the preferred infusing step 90 of the method of the invention, the extracted fruit residues are treated through countercurrent contact with a solution of sugar 92, optionally also containing food additives, such as vitamins, colorants, and flavorings. Preferably, the infusion solution has a sugar content of at least about 65 brix, more preferably in the range from about 65 to about 75 brix. Preferably, the infusion is carried out at a temperature that maximizes the rate of infusion of sugar into the fruit residues, without denaturing or unduly softening the structure of the fruit residues. Preferably, the temperature of the infusing step 90 is carried out at from about 110° to about 125° F., more preferably about 115° to about 120° F. Preferably, the fruit product after infusion has a sugar content of from about 35 to about 45 brix. Moreover, food acids, such as citric acid, fumaric acid, and the like, must be added back by the infusion process to provide a "fruity" taste. The amount to be added depends on the degree to which acids were removed in the extraction step, and is best judged by tasting the product and adjusting acid addition. However, the acidity of the infusion solution is preferably in the range about 0.2 to about 1.00 times the acidity of the original fruit (expressed as citric acid on a wt/wt basis); and more preferably about 0.4 to about 0.8 times the original fruit's acidity. Spent infusion solution from the infuser exit is routed to a reconstituting stage 108 where sugar, and optionally other additives, are added to the solution to prepare fresh infusing solution that is recycled to the infusion solution storage 92.

After infusion, the infused fruit product exiting from the infuser is screened and washed 100 and any liquid 104 is returned to the reconstituting stage 108 for reconcentration, through addition of sugar, and optional food additives, to reconstitute infusion syrup. During washing, water 102 removes any surface adhering sugar and the washings 104 are also recycled to stage 108 for making additional infusion syrup 92. The washed infused fruit are then dried 110 to a moisture content of about 14% to about 22 wt %. Preferably, the drying is carried out in a continuous countercurrent dryer, although other dryers are also suitable. After drying, the dried infused fruit are preferably treated 120 with a surface coating of an edible oil. This surface coating may be applied by a light mist spray. This optional coating of the fruit with oil reduces the tendency of the fruit to stick together to form clumps so that packaging 140 of the fruit is facilitated, after inspection 130.

The following examples are illustrative of aspects of an embodiment of the method of the invention, and should not be construed as limiting of the invention, as described above and claimed herebelow.

EXAMPLE

Comparison of the Extraction Process of the Invention with a Process that does not Vary Extractor Pressure A batch of 300 grams of cranberries, sliced in half, was placed in a 2,000 ml vacuum flask as a batch extractor together with 450 grams of water, at 21° C. (70° F.). The extraction liquid was sampled every five minutes and the sugar concentration (in brix) was determined. The results are plotted as curve A in FIG. 3.

A second batch of cranberries, likewise sliced in half, was also treated in the batch extractor, but at 45° C. (113° F.). The analyses of samples taken from this extractor, at five-minute intervals, are shown as graph B of FIG. 3.

Five further extractions were carried out, in accordance with the method of the invention, wherein the extractor was subjected to cyclical variation of pressure.

As before, 300 grams of halved berries were extracted in the 2,000 ml batch extractor with 450 grams of water at 70° F., but a pressure cycle, ranging from a 15-inch Hg vacuum (low) to atmospheric (high), with a five-minute period or cycle time was applied. The results are shown in curve C of FIG. 3.

Similar batches of berries were treated at 113° F., with a five-minute cycle (curve D of FIG. 3); and 113° F. with a one-minute cycle (curve E of FIG. 3); and at 113° F., with a 30-second cycle (curve F of FIG. 3).

Two additional 300 gram batches of berries were halved, and also pierced through the skin. These were also extracted—one at atmospheric pressure and 21° C. (70° F.) without pressure cycling (Curve G); and another subjected to pressure cycled between 24 inches of Hg vacuum and atmospheric pressure with a 30 second cycle time, while at 41° C. (104° F.) (Curve H).

Comparing curves A and B, it is clear that a brix of more than about 1.7 cannot be achieved at 70° F., i.e., the percentage recovery of extractables is low when the pressure is atmospheric. As the temperature is increased to 113° F., recovery improves and an extraction liquid of about 2.2 brix can be achieved after about 30–45 minutes. Without pressure cycling, temperature dictates rate and extent of extraction.

Surprisingly, however, when a vacuum cycle is applied, in accordance with the invention, an extraction fluid with a brix of 2.8 can be achieved in about 30 minutes when the temperature is 70° F. (curve C), and a brix of about three is achieved when the temperature increases 113° F. (curve D). Thus, as a result of the pressure cycling of the invention, the temperature effect is no longer predominant, but the pressure cycling effect becomes more important.

Curves E and F show that an extraction fluid with a brix of 3.5 is produced at about 22 minutes residence time when the temperature is 113° F., and the cycle time is one minute. However, the residence time is reduced to only about 15 minutes, when the rate of pressure cycling is doubled to a cycle time of only 30 seconds. Thus, the period or rate of cycling has a significant effect.

Each of the batches of berries, extracted as described above, was then subjected to a second cycle of extraction. Surprisingly, the results of the second cycle, shown in FIG. 4, indicate that the method of the invention is able to more efficiently extract residual sugar from berries, even though more sugar had been extracted in the first cycle, than for the control batches without pressure cycling. Curves A and B, where no pressure cycling was applied, were carried out at 70° F. and 113° F. respectively. Curves D and E show the results of extractions with five-minute pressure cycle times, carried out at 70° F. and 113° F. respectively. Curves E and F show the results of further extractions carried out at 113° F., at cycle times of one minute and 30 seconds, respectively. It is readily inferred from this information that in a continuous process, residence time will be significantly reduced and extraction will be enhanced.

The effect of piercing the berries in addition to halving is to increase extraction rate. As seen from a comparison of curves A and G, of FIGS. 3 and 4, even without pressure cycling there is enhancement of extraction rate. While an enhancement is also noticeable with the cycling of pressure, as seen from comparing curves F and H, of FIG. 3, it is not as pronounced in a second extraction cycle, as seen in FIG. 4. This is to be expected since air has already been removed in the first cycle and pressure cycling plays the dominant role in "pumping" liquid into and out of the berries to enhance extraction.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of processing fruit into a solid product and a liquid product, the method comprising:
   (a) exposing an inner portion of the fruit, said inner portion beneath an overlying skin;
   (b) subjecting the fruit to a plurality of sequential pressure variations in a liquid medium, the pressure variations sufficient to significantly increase a rate of extraction of components of the fruit into the liquid medium, the liquid medium at a temperature sufficient to promote the rate of extraction without substantial denaturing of the fruit; and (c) separating extracted fruit from a liquor comprising extracted fruit components.

2. The method of claim 1, wherein the step of exposing comprises cutting the fruit substantially in halves to expose an inner portion.

3. The method of claim 2, wherein before the step of cutting, the fruit is sequentially subjected to freezing, sizing, and thawing to a temperature sufficient to facilitate the cutting of the fruit for exposing the inner portion.

4. The method of claim 1, wherein the step of subjecting to cycles of pressure variations comprises subjecting in a countercurrent continuous extraction process.

5. The method of claim 1, wherein the step of subjecting to cycles of pressure variations is carried out at a temperature in the range from about 100° to about 120° F.

6. The method of claim 1, wherein the step of subjecting comprises subjecting to pressure variations in the range from about 24 inches Hg of vacuum to about 30 psig.

7. The method of claim 1 or claim 6, wherein the subjecting to cyclical pressure variations comprises subjecting to pressure variations having a cycle time of from about 30 seconds to about 5 minutes.

8. The method of claim 1 or claim 6 wherein the subjecting to cyclical pressure variations comprises subjecting to pressure variations having a cycle time of from about 2 minutes to about 45 seconds.

9. The method of claim 1, further comprising infusing the extracted fruit of the separating step with a solution comprising sugar, and food acids, and optionally, food coloring, and a flavoring composition.

10. The method of claim 9, further comprising washing the infused fruit solids to remove surface sugar, and reconstituting wash liquids to produce a solution for infusing.

11. The method of claim 9 or claim 10, further comprising drying the infused extracted fruit solids to produce a dried, sugar infused, fruit product.

12. A method of producing a solid fruit product having a reduced content of naturally occurring fruit components, the method comprising:

(a) obtaining extracted fruit from the method of claim 1, the extracted fruit having a reduced content of naturally-occurring fruit components;

(b) infusing the obtained extracted fruit with a solution comprising a sugar, and food acid; and (c) drying the infused, extracted fruit to produce a solid fruit product.

13. The method of claim 12, further comprising washing the infused extracted fruit to remove surface-adherent sugar before the step of drying.

14. The method of claim 12, wherein the step of drying includes drying to a moisture content of from about 14 to about 22 wt %.

15. The method of claim 12, further comprising, after drying, lightly coating the fruit product with an edible oil.

16. The method of claim 12, wherein the infusing is with a solution having a sugar content of about 65 to about 75 brix.

17. The method of claim 12, wherein the obtaining comprises obtaining extracted fruit from which about 98% of the naturally occurring sugars have been extracted.

18. The method of claim 12, wherein the infusing includes infusing for a sufficiently long time in a sufficiently concentrated solution to produce a solid fruit product with a sugar content of about 35 to about 45 brix.

19. The method of claim 12 or claim 16, wherein the infusing is in a countercurrent continuous process.

20. The method of claim 12 or claim 16, wherein the infusing is for a period of from about 75 to about 120 minutes.

21. The method of claim 12 or claim 16, wherein the infusing is at a temperature in the range about 110° to about 115° F.

22. The method of claim 1, wherein the separating includes separating extracted fruit from which about 98% of the naturally occurring sugars have been extracted.

23. The method of claim 12, wherein the infusing is with a solution comprising a food acid content of about 0.2 to about 1.0 times the acidity of an acidity of a fruit extracted to produce the extracted fruit of the obtaining step (a).

* * * * *